United States Patent [19]
Jani

[11] Patent Number: 5,655,945
[45] Date of Patent: Aug. 12, 1997

[54] VIDEO AND RADIO CONTROLLED MOVING AND TALKING DEVICE

[75] Inventor: Jeffrey Scott Jani, Long Beach, Calif.

[73] Assignee: Microsoft Corporation, Redmond, Wash.

[21] Appl. No.: 535,785

[22] Filed: Sep. 28, 1995

Related U.S. Application Data

[63] Continuation of Ser. No. 251,010, May 31, 1994, abandoned, which is a continuation of Ser. No. 962,916, Oct. 19, 1992, abandoned.

[51] Int. Cl.$^6$ .................................................. A63H 33/00
[52] U.S. Cl. ........................... 446/175; 446/299; 40/414; 386/96
[58] Field of Search .................................. 446/297–303, 446/175, 353, 354, 356, 357; 434/307, 308, 321; 360/79; 358/335; 40/414

[56] References Cited

U.S. PATENT DOCUMENTS

| | | |
|---|---|---|
| 2,562,179 | 7/1951 | Dorf . |
| 3,199,249 | 8/1965 | Carver et al. . |
| 3,292,489 | 12/1966 | Johnson et al. . |
| 3,369,073 | 2/1968 | Scholz . |
| 3,406,482 | 10/1968 | Ryan et al. . |
| 3,493,674 | 2/1970 | Houghton . |
| 3,566,482 | 3/1971 | Morchand . |
| 3,599,221 | 8/1971 | Baer . |
| 3,660,932 | 5/1972 | Raffeli et al. . |

(List continued on next page.)

FOREIGN PATENT DOCUMENTS

WO87/07522  12/1987  WIPO .
WO91/10490  1/1991  WIPO .

*Primary Examiner*—Mickey Yu
*Attorney, Agent, or Firm*—Jones & Askew

[57] ABSTRACT

A video and radio controlled remote device control system including at least one moving and talking remote device is presented. Standard video tapes used in cameras or to home record TV programs have unused space on which data can be stored. This space may be called the vertical interval space. Appropriate digital control data is recorded in this unused vertical interval space. The encoded signal is played when the tape plays and is detected by a control box coupled between the VCR and the television. The control box generates an RF (radio) signal as a function of the encoded signal. A radio receiver in at least one, and possibly substantially more than one device receives the signal and as a function thereof generates selected voice and/or other sounds and mechanical control signals. Each device has a plurality of motors. Selected motors are controlled as a function of response to the transmitted signals. One practical example of a combination of the devices could be small characters singing, dancing or moving in concert with and controlled by a video tape of a child's movie.

1 Claim, 2 Drawing Sheets

5,655,945
Page 2

| | | FOREIGN PATENT DOCUMENTS | |
|---|---|---|---|
| 3,663,937 | 5/1972 | Bolner . | |
| 3,671,668 | 6/1972 | Reiffel . | |
| 3,728,480 | 4/1973 | Baer . | |
| 3,735,503 | 5/1973 | Dow et al. . | |
| 3,737,566 | 6/1973 | Baer . | |
| 3,743,767 | 7/1973 | Bitzer et al. . | |
| 3,777,410 | 12/1973 | Robinson . | |
| 3,828,469 | 8/1974 | Giroud . | |
| 3,872,461 | 3/1975 | Jarosik et al. . | |
| 3,891,792 | 6/1975 | Kimura . | |
| 3,900,887 | 8/1975 | Soga et al. . | |
| 3,934,226 | 1/1976 | Stone et al. . | |
| 3,947,972 | 4/1976 | Freeman . | |
| 3,976,992 | 8/1976 | Criscimagna . | |
| 3,993,861 | 11/1976 | Baer . | |
| 4,078,316 | 3/1978 | Freeman . | |
| 4,117,605 | 10/1978 | Kurland et al. . | |
| 4,170,832 | 10/1979 | Zimmerman . | |
| 4,186,413 | 1/1980 | Mortimer . | |
| 4,205,847 | 6/1980 | Steiger et al. . | |
| 4,206,557 | 6/1980 | Swinton . | |
| 4,210,329 | 7/1980 | Steiger et al. . | |
| 4,218,697 | 8/1980 | Leventer . | |
| 4,306,630 | 12/1981 | Monte et al. . | |
| 4,307,891 | 12/1981 | Doornick et al. . | |
| 4,329,684 | 5/1982 | Monteath et al. . | |
| 4,393,728 | 7/1983 | Larson et al. . | |
| 4,445,187 | 4/1984 | Best . | |
| 4,456,925 | 6/1984 | Skerlos et al. . | |
| 4,464,124 | 8/1984 | Romero et al. . | |
| 4,479,142 | 10/1984 | Buschman et al. . | |
| 4,484,302 | 11/1984 | Cason et al. . | |
| 4,496,976 | 1/1985 | Swanson . | |
| 4,563,162 | 1/1986 | Ishimoto . | |
| 4,563,626 | 1/1986 | Ohtake . | |
| 4,569,026 | 2/1986 | Best . | |
| 4,571,640 | 2/1986 | Baer . | |
| 4,579,338 | 4/1986 | Heffron . | |
| 4,589,138 | 5/1986 | Milner et al. . | |
| 4,595,333 | 6/1986 | Ono et al. . | |
| 4,599,644 | 7/1986 | Fischer . | |
| 4,602,227 | 7/1986 | Clark et al. . | |
| 4,602,279 | 7/1986 | Freeman . | |
| 4,608,601 | 8/1986 | Shreck et al. . | |
| 4,609,358 | 9/1986 | Sangster . | |
| 4,613,904 | 9/1986 | Lurie . | |
| 4,626,013 | 12/1986 | Barrows . | |
| 4,626,164 | 12/1986 | Chang . | |
| 4,638,445 | 1/1987 | Mattaboni . | |
| 4,641,251 | 2/1987 | Inoue . | |
| 4,673,357 | 6/1987 | Ito . | |
| 4,683,669 | 8/1987 | Greer, Jr. . | |
| 4,698,775 | 10/1987 | Koch et al. . | |
| 4,709,265 | 11/1987 | Silverman et al. . | |
| 4,729,563 | 3/1988 | Yokoi . | |
| 4,736,826 | 4/1988 | White et al. . | |
| 4,753,597 | 6/1988 | Pash et al. . | |
| 4,807,031 | 2/1989 | Broughton et al. . | |
| 4,808,064 | 2/1989 | Bartholet . | |
| 4,819,076 | 4/1989 | Briggs . | |
| 4,835,450 | 5/1989 | Suzuki . | |
| 4,840,602 | 6/1989 | Rose | 446/297 X |
| 4,846,693 | 7/1989 | Baer | 446/298 X |
| 4,847,699 | 7/1989 | Freeman . | |
| 4,847,700 | 7/1989 | Freeman . | |
| 4,930,019 | 5/1990 | Chu . | |
| 5,021,878 | 6/1991 | Lang . | |
| 5,198,893 | 3/1993 | Lang . | |
| 5,213,510 | 5/1993 | Freeman . | |

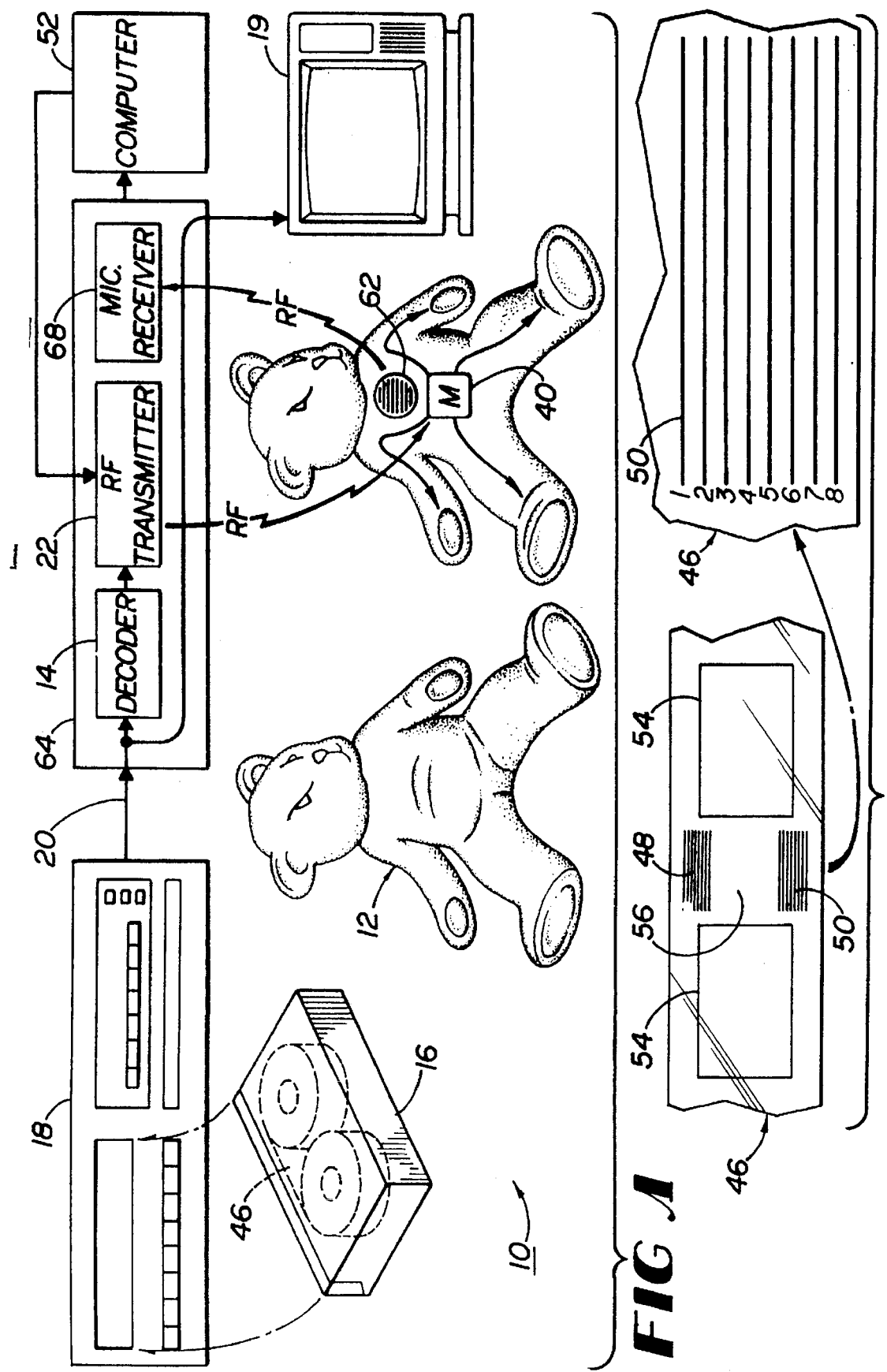

VIDEO AND RADIO CONTROLLED MOVING AND TALKING DEVICE

This is a continuation of application Ser. No. 08/251,010, filed May 31, 1994, abandoned, which is a continuation of application Ser. No. 07/962,916, filed Oct. 19, 1992, abandoned.

BACKGROUND OF THE INVENTION

1. Field of the Invention

The present invention relates to controlled devices which may act, move and talk in response to control signals recorded on two presently unused channels on video tapes and transmitted to the devices by radio.

2. Description of the Prior Art

Radio controlled devices include many examples such as garage door openers, drones used for antiaircraft target practice, etc. Toys such as Teddy Ruxpin can move and sing independently in response to signals from an audio tape inserted into Teddy. The combination of the prior art is at present relatively unsophisticated, as shown by Teddy's nose dive in sales after a promising start.

"Little Mermaid" was a fairly good movie, grossing over $100,000,000.00. It was not a great movie in attendance, but merchandizing is another matter. Its gross in merchandizing was more than one billion dollars, which dwarfs the profits from those people who saw it in theaters. This gross, in turn, can be dwarfed by a future movie which plays on a casset with the main characters dancing and singing and acting out the movie in front of children. This would be a delight for children.

What is needed, or at least desired, but not taught by the prior art is a system to use current state of the art tapes and add the necessary signals to the master which will then at no additional substantial cost make retail tapes which can be sold and used as at present and are compatible with present playback machines, called VCR's. An attachment between the VCR and TV would detect the additional signal and transmit it by low powered radio signal. In the same room would be one or more toys. As the movie played on the tape, the toys, which could be characters in the movie, would act, sing, and otherwise interact with the movie. Toys might be sold or rented with tapes. Toys could be controlled in other ways to do other things.

The same invention could administer selected control in other ways, such as voice activated controls for disabled people. The disabled person could enable a selected tape or other digital device by voice and then control and interact by voice as the device generated selected signals.

SUMMARY OF THE INVENTION

A radio controlled system for transmitting digital data to control at least one remote device is presented. The system comprises:

- a source of electrical power coupled to all electrical elements;
- memory means which stores digital data;
- decoding means which receives digital data from the memory means and derives at least one signal therefrom;
- coupling means which couple the decoding means to receive the digital data from the memory means; and
- RF transmitting means coupled to receive the output of the decoding means and transmit the decoded data.

At least one remote device is controlled by the system. Each remote device comprises:

RF receiving and actuator means which are tuned to receive selected parts only of the radio output of the RF transmitting means, power means coupled to other elements of the remote device to furnish power, custom skeletal structure and linkages that cause a plurality of movements, a plurality of electric motors each coupled to drive a linkage which is coupled to drive a selected part of the custom skeletal structure, control means coupled to drive each electric motor in response to selected received digital data, and a digital receiver which receives voice actuating digital data and transmits it to a speaker.

In a first example, each remote device comprises a toy like a teddy bear which may be called a character. Each of the remote devices in turn includes the following elements and relationships:

Power means comprises a rechargeable battery.

The custom skeletal structure and linkages cause the character to move in preselected patterns.

A muscle equivalent system comprises at least eight muscle equivalents, each moving one of at least eight linkages to cause selected device and custom skeletal Structure movement.

The memory means comprises an encoded tape which is the equivalent of VHS, with two tracks added, one track containing separate digital movement data for each remote device and the other track containing selected digital sound data for each remote device, the tape being capable of playing in the equivalent of a home video VCR player.

A decoder/transmitter control box is coupled between a video tape player and a TV to detect signals transmitted from the tape player to the TV. A computer causes the transmitter to transmit selected movement signals which may differ between remote devices to each remote device. In addition, the computer sends digital sound signals via the transmitter which may differ between remote devices to each remote device.

The encoded tape comprises a plurality of sequential frames. In between each frame is a vertical interval space which can be used to store additional digital data. The vertical interval space has recorded thereon two channels of digital data. The first channel has recorded thereon voice digital data and the second channel has recorded thereon digital movement data.

DRAWING DESCRIPTION

Reference should be made at this time to the following detailed description which should be read in conjunction with the following drawings of which:

FIG. 1 is a detailed block diagram of the invention;

FIG. 2 is a view of the tape encoding system of the invention; and

DETAILED DESCRIPTION OF THE INVENTION

Figure 3:
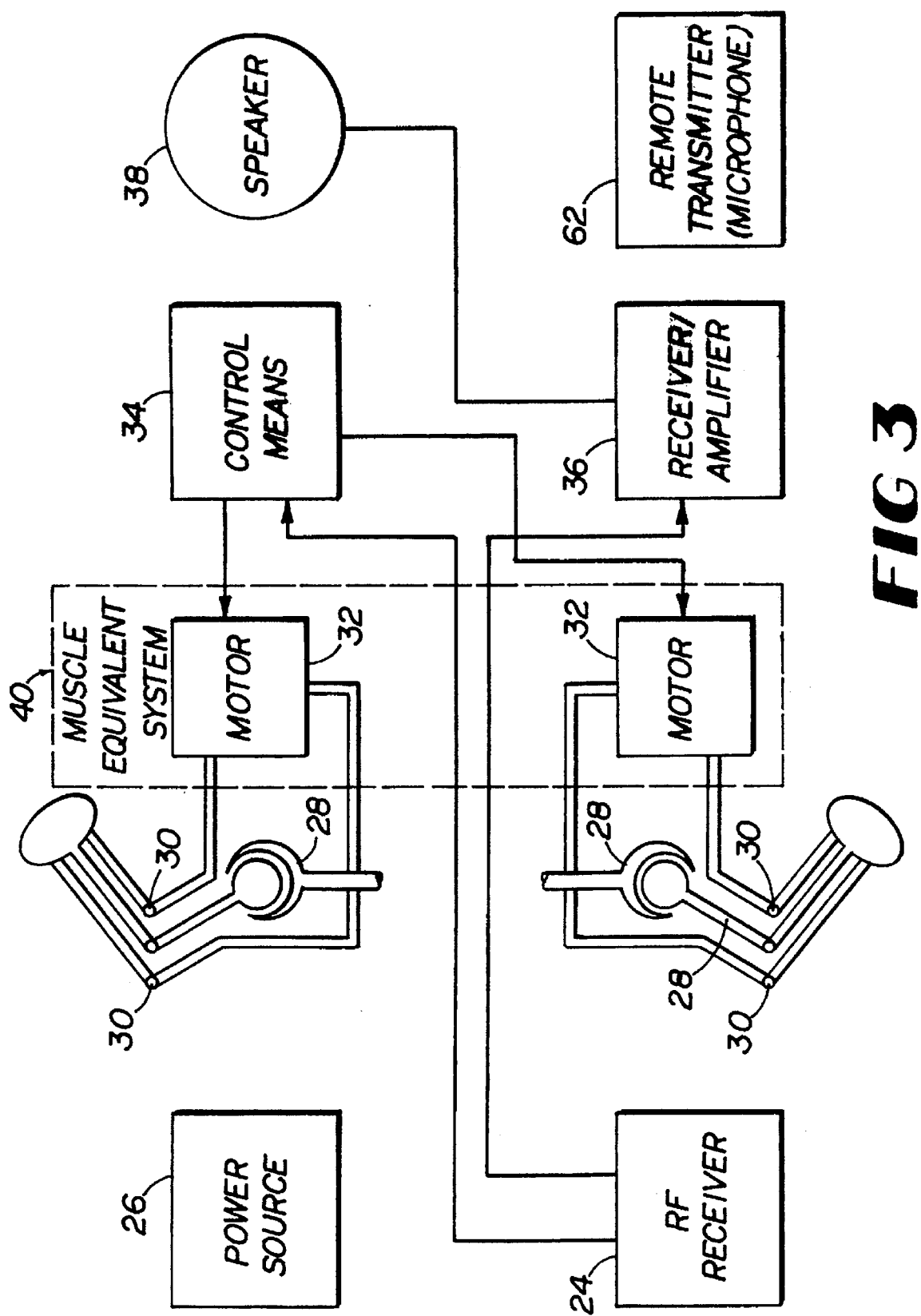
FIG. 3 is a detailed block diagram of a part of a remote device according to the invention.

A radio controlled system 10 for transmitting digital data to control at least one remote device 12 is presented. The system 10 comprises a source of electrical power coupled to all electrical elements. The source is power transmitted from a video tape machine, called herein a VCR 18 via coupling means 20. The VCR receives power in the typical prior art manner such as being plugged into a wall outlet.

Memory means 16 which store digital data comprise one or more specially prepared video tapes 16, also called herein VCR tapes 16.

Decoding means 14 which receives digital data from the memory means 16 and derives at least one signal therefrom to control at least one remote device 12.

Coupling means 20 couple the decoding means 14 to receive the digital data from the memory means 16.

RF transmitting means 22 are coupled to receive the output of the decoding means 14 and transmit the decoded data to RF receiving means 24 in remote devices 12.

At least one remote device 12 is controlled by the system. In the example described herein, up to eight remote devices 12 may be controlled. Each remote device 12 best shown in FIG. 3 comprises:

RF receiving means 24, also referred to as RF receiving and actuating means 24 which are tuned to receive selected parts only of the radio output of the RF transmitting means 22. Power means, also referred to as power source means 26 are coupled to all other elements of the remote device 12 which require electrical power to furnish power. The power means comprise in this example a rechargeable battery.

Custom skeletal structure 28 and linkages 30 cause a plurality of selected complex movements. The custom skeletal structure 28 takes the place of and serves the purpose of an animal skeleton. The linkages 30 serve the purpose of an animal's ligaments and tendons. A plurality of electric motors 32 are each coupled to drive a linkage 30 which linkage 30 is coupled to drive a selected part of the custom skeletal structure 28. Each electric motor 32 sreves the purpose of an animal's muscle.

Control means 34 are coupled to drive each electric motor 32 in response to selected received digital data. A digital receiver 24, also referred to as an RF receiver 24 receives voice actuating digital data and is then coupled to a voice receiver/amplifier 36, known to the prior art. Voice receiver/amplifier 36 transmits the voice activating digital data to a speaker 38. Remote device transmitter 62 is a microphone and transmitter which receives sound waves and transmits them to the receiver 68 in the control box 64. Receiver 68 is coupled to computer 52. The computer 52 may be an IBM PC or any other type of personal computer. Computer 52, using prior art voice recognition software interprets the sound waves and sends preselected responses to transmitter 22 in the control box 64.

In a first example, each remote device 12 comprises a toy 12 like a teddy bear 12 which may be called a character 12. Each of the remote devices 12 in turn includes the following elements and relationships:

Power means 26 comprises a rechargeable battery 26 in this example. Other power means are possible.

The custom skeletal structure 28 and linkages 30 cause the character 12 to move in preselected patterns. Because of the complex series of powered linkages 30, extremely complex movements can be performed which mimic animals.

A muscle equivalent system comprises at least eight muscle equivalents 40. Each muscle equivalent system 40 moves one of at least eight pair of linkages 30 to cause selected remote device 12 and custom skeletal structure 28 movement.

The memory means 16 comprises an encoded tape 46 best shown on FIG. 2 which is the equivalent of a standard VHS tape 16, with two tracks 48, 50 added. The present system 10 is able to perform complex tasks based on data recorded on a standard VHS tape 16 in addition to the data usually recorded on a standard VHS tape 16 only because the inventor has been able to record additional material on parts of a standard VHS tape 16 which are usually left blank to act as a buffer zone between recorded data frames 54. One track 48, 50 contains separate digital movement data for each remote device 12 and the other track 50, 48 contains selected digital sound data for each remote device 12. The decoder 14 decodes the data and causes the data to be transmitted so that each remote device 12 receives only its selected data. This can be done by means known to the prior art such as use of different frequencies or preceding data with gating information which disables each remote device 12 which is not selected to receive and act on selected data. The tape is capable of playing in the equivalent of a home video VCR player, and in fact that ability to play a standard tape with more encoded in it in a standard VCR, to see the movie on TV and at the same time to hate up to 8 toys sing, talk, act, dance or move in coordination with the movie is what gives the present system 10 much of its commercial value.

A decoder/transmitter control box 64 is coupled between a video tape player 18 and a TV 19 as shown in FIG. 1. The decoder/transmitter control box 64 detects signals transmitted from the video tape player 18 or VCR 18 to the TV 19.

The encoded tape 46 comprises a plurality of sequential frames 54 as shown in FIG. 2. In between each frame 54 is a vertical interval space 56 which can be used to store additional digital data. The vertical interval space 56 has recorded thereon two channels 48, 50 of digital data. The first channel 48, 50 has recorded thereon voice digital data and the second channel 50, 48 has recorded thereon digital movement data.

A particular example of the invention has been described herein. Other examples will be obvious to those skilled in the art. The invention is limited only by the following claims.

I claim:

1. A remote control animated doll system comprising in combination:

at least one animated toy;

a magnetic storage medium having an audio/visual program recorded thereon and embedded movement data and sound data recorded within said audio/visual program, said embedded movement data and sound data corresponding to sound control signals and movement control signals for said at least one animated toy;

playback means, having a playback output, for said magnetic storage medium for reproducing said audio/visual program and for providing said movement data and sound data at said playback output;

first decoder means, having a decoder output, connected to said playback output for providing said sound control signals and said movement control signals at said decoder output in response to said movement data and said sound data;

a first wireless transmitter connected to said decoder output for transmitting said sound control signals and said movement control signals to said at least one animated toy;

said animated toy comprising a first receiver for receiving sound control signals and movement control signals, a sound generating device, a second decoder means connected to said first receiver for providing said sound control signals to said sound generating device and for providing said movement control signals to a muscle equivalent system for causing movement of said animated toy; a microphone; a second wireless transmitter means connected to said microphone for transmitting speech signals in response to signals generated by said microphone;

second receiver means for receiving said transmitted speech signals and providing demodulated speech signals at a second receiver output;

speech recognition means having a speech recognition input connected to said second receiver means and an output connected to said first wireless transmitter means for providing preselected ones of said sound control signals and said movement control signals to said first wireless transmitter means in response to detection of predetermined patterns in said demodulated speech signals.

* * * * *